(No Model.) 2 Sheets—Sheet 2.
S. A. BHISE.
ADVERTISING OR SIGN LAMP.
No. 603,251. Patented May 3, 1898.
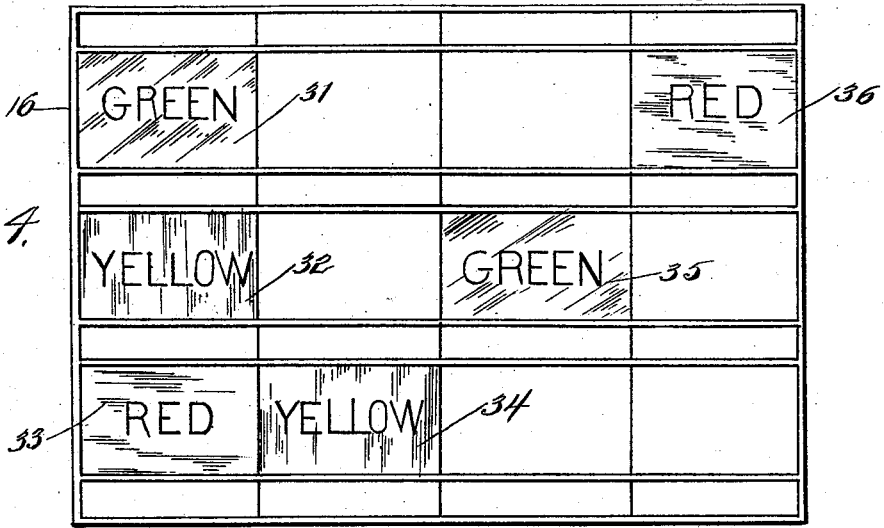
Fig. 4.
Fig. 5.
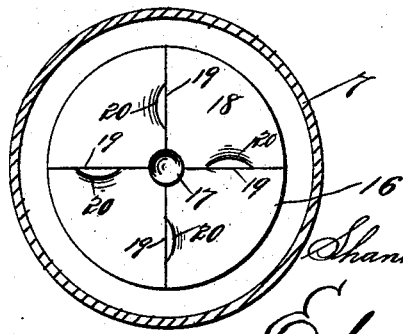
Fig. 6.
WITNESSES:—
J. W. Danielson Jr.
C. Gerst
INVENTOR
Shanker Abaji Bhise
BY
Edgar Tate & Co.
ATTORNEYS.

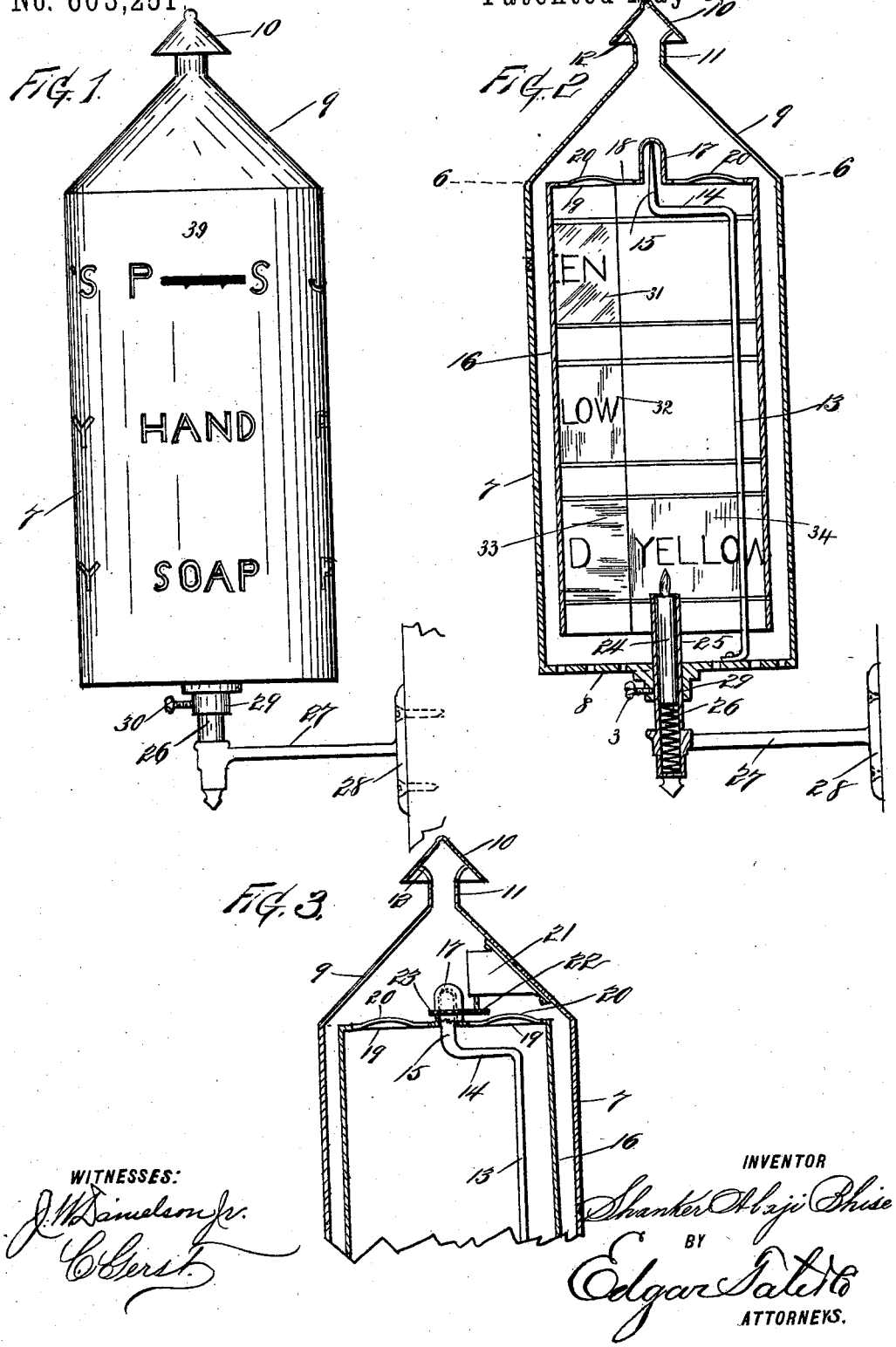

UNITED STATES PATENT OFFICE.

SHANKER ABAJI BHISE, OF BOMBAY, INDIA.

ADVERTISING OR SIGN LAMP.

SPECIFICATION forming part of Letters Patent No. 603,251, dated May 3, 1898.

Application filed May 27, 1897. Serial No. 638,477. (No model.)

*To all whom it may concern:*

Be it known that I, SHANKER ABAJI BHISE, a subject of the Queen of Great Britain, residing at Bombay, India, have invented certain new and useful Improvements in Advertising or Sign Lamps, of which the following is a full and complete specification, such as will enable those skilled in the art to which it appertains to make and use the same.

This invention relates to signal, advertising, and sign lamps; and the objects thereof are to provide an improved lamp of this class in which are employed an outer cylindrical casing and an inner revoluble casing, the outer cylindrical casing being provided with any suitable sign or advertisement, the letters and words of which are cut therein, and the inner revoluble casing being provided with a plurality of transparent or translucent differently-colored panels or panes, which are arranged in such manner that when the inner casing is revolved the letters and words of the sign or advertisement will appear successively in the order in which they read; and with these and other objects in view the invention consists in the construction, combination, and arrangement of parts hereinafter described and claimed.

The invention is fully disclosed in the following specification, of which the accompanying drawings form a part, in which—

Figure 1 is a side view of my improved lamp; Fig. 2, a central vertical section thereof; Fig. 3, a partial section similar to Fig. 2, showing a modified form of construction; Fig. 4, a plan view of the casing of the inner revoluble cylinder extended; Fig. 5, a similar view of the outer cylindrical casing extended, and Fig. 6 a partial section on the line 6 6 of Fig. 2.

In the drawings forming part of this specification the separate parts of my improvement are designated by the same numerals of reference in each of the views, and in the practice of my invention I provide a lamp which comprises an outer stationary cylindrical casing 7, which is provided with a perforated bottom 8 and a conical top 9, on which is placed a conical cap 10, which is secured to a neck 11, formed on said conical top 9 and around which are ventilating-openings 12.

Secured to the perforated bottom 8, at one side thereof, is an upwardly-directed rod 13, the upper end of which is provided with an inwardly-directed arm 14, which is provided with an upwardly-directed prong 15, and I also provide an inner revoluble cylindrical casing 16, which is closed at the top and open at the bottom and which is provided centrally with a thimble 17, into which the prong 15 projects.

The prong 15 of the rod 13 forms a pivotal support for the inner cylindrical casing 16, and said casing is free to revolve thereon, and the upper end 18 of the inner cylinder 16 is provided with radial slits 19, and the material thereof at one side of said slit is bent upwardly, as shown at 20, so as to provide escape-openings for the heated gases and products of combustion as they ascend through the inner revoluble casing, and the form of these upwardly-directed bent portions is such that they form propellers or wings which operate to revolve said inner cylinder. This construction is best shown in Figs. 2, 3, and 6, and in Fig. 3 I have shown at 21 a casing in which an electric or spring motor may be placed for revolving the inner cylindrical casing 16, and connected with this motor is a pinion 22, which operates in connection with a gear-wheel 23, mounted on the thimble 17.

The motor 21 may be used independently or in connection with the wings or propellers 20 for revolving the inner casing, and in Figs. 2 and 3 I have shown a candle 24, which is mounted in a tubular socket 25, which passes vertically through the bottom 8 of the outer casing 7, and in the bottom of this tubular socket is placed a spiral spring 26, and connected with the lower end of said tubular socket 25, which supports the candle, is a bracket-arm 27, which may be secured to a wall or other support by means of a plate 28, and secured to or formed on the bottom 8 of the outer cylindrical casing 7 is a sleeve 29, through which is passed a set-screw 30, by means of which the lamp may be adjusted on the tubular socket or candle-holder 25.

Any desired form of lamp or illuminating device, however, may be substituted for the candle 24, and other means for supporting the lamp may be substituted for the bracket-arm 27.

In Fig. 4 I have shown the material of the inner revoluble casing extended, and said casing preferably consists of a sheet of metal or other suitable material, in which are placed, at the left-hand end thereof, three colored translucent panels or panes 31, 32, and 33, these panels or panes being arranged in a vertical line, and said panels or panes are colored green, yellow, and red, beginning with the top, and arranged diagonally of said casing or the material thereof are three other panels or panes 34, 35, and 36, and said panels or panes are colored yellow, green, and red, beginning with the bottom one.

The bottom panel or pane 34 is arranged adjacent to the red panel 33 in the left-hand column of colored panels, while the panels or panes 35 and 36 are arranged in the order named, the last panel or pane 36 being arranged in the upper right-hand corner, while the green panel or pane 35 is arranged between the red panel or pane 36 and the yellow panel or pane 34. These colored panels may be composed of any desired material, paper or glass being preferred, and the casing in which they are placed may be composed of metal, cardboard, or any other preferred material.

In Fig. 5 I have shown the material of the outer stationary casing 7 or the sheet of which said casing is composed extended, and this casing is composed of metal, and arranged thereon in vertical lines are the words of the advertisements or signs which it is desired to display, four of said advertisements or signs being shown and designated by the reference-numerals 37, 38, 39, and 40. The letters of these words are cut through the material of the casing, and it will be understood that in the operation of the device the inner casing is revolved from left to right, and as it slowly turns the letters of the first word of one of the signs will appear successively in red, the letters of the next word in green, and the letters of the last word in yellow, and then all the words will appear at once in green, yellow, and red, and as said inner cylinder continues to revolve each of the signs or advertisements the words of which are arranged in vertical lines in the outer casing will appear in the same order, the letters of the upper words first appearing successively in red, the letters of the second word then appearing successively in green, and the letters of the last word in yellow, and then all of the words in green, yellow, and red.

My improved lamp is particularly adapted for use by shop-keepers, and is designed to be placed in a window or at the top of a door or in any other desired place, and it will be apparent that any desired sign or advertisement may be exhibited thereby, all that is necessary being to cut the desired sign in the manner shown and described in the outer casing, the panels or panes of the inner revoluble casing being colored in any desired manner. It will also be apparent that many other colors may be employed besides those shown and many other changes in and modifications of the construction herein described may be made without departing from the spirit of my invention or sacrificing its advantages.

My improved sign is attractive and is well adapted to command attention until the advertisements on the casing are read.

Having fully described my invention, I claim as new and desire to secure by Letters Patent—

1. An advertising or sign lamp, provided with an outer stationary casing, and an inner revoluble casing said outer casing being provided with signs or advertisements, the words of which are cut therein, in vertical lines, and said inner casing being provided with a vertical row of colored transparent or translucent panels or panes which correspond with the number of the words in each sign, and with an equal number of transparent or translucent panels or panes arranged in the same circumferential line but diagonally of said casing, substantially as shown and described.

2. An advertising or sign lamp, comprising an outer cylindrical stationary casing, provided with a plurality of signs, the words of which are cut in vertical lines therein, and an inner revoluble casing which is provided with a vertical row of colored panels or panes which equal in number the words in each sign or advertisement, and with a diagonal row of colored panes or panels which also equal in number the words of each sign, substantially as shown and described.

3. An advertising or sign lamp, comprising an outer cylindrical stationary casing, provided with a plurality of signs, the words of which are cut in vertical lines therein, and an inner revoluble casing which is provided with a vertical row of colored panels or panes which equal in number the words in each sign or advertisement, and with a diagonal row of colored panes or panels which also equal in number the words of each sign, said inner revoluble casing being pivotally supported and provided at the upper end thereof, with propeller-fans which are formed integrally therewith, and which are adapted to be operated by the heated gases or products of combustion, substantially as shown and described.

4. An advertising or sign lamp, comprising an outer cylindrical stationary casing, provided with a plurality of signs, the words of which are cut in vertical lines therein, and an inner revoluble casing which is provided with a vertical row of colored panels or panes which equal in number the words in each sign or advertisement, and with a diagonal row of colored panes or panels which also equal in number the words of each sign, said inner revoluble casing being pivotally supported and provided at the upper end thereof, with propeller-fans which are formed integrally therewith, and which are adapted to be operated by the heated gases or products of combustion, and means for supporting a candle or other illuminating-sign in the bottom of the revoluble
5 casing, substantially as shown and described.

In testimony that I claim the foregoing as my invention I have signed my name, in presence of the subscribing witnesses, this 29th day of April, 1897.

SHANKER ABAJI BHISE.

Witnesses:
 C. F. RELEGED,
 B. C. WHARNEKE.